April 2, 1929.    C. E. RAMEY    1,707,415
AUTOMATIC EMERGENCY BRAKE RELEASE
Filed May 11, 1927
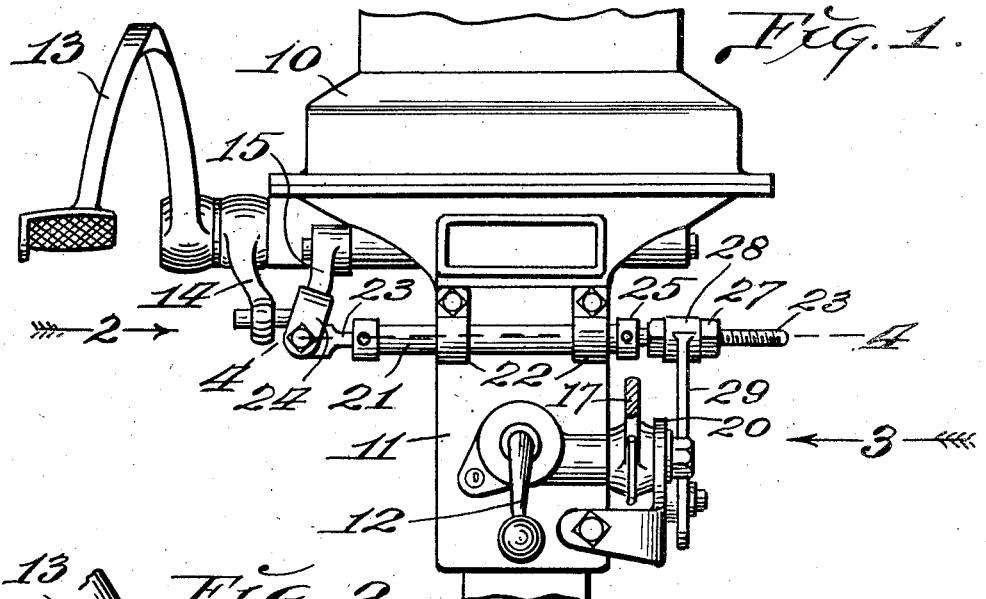
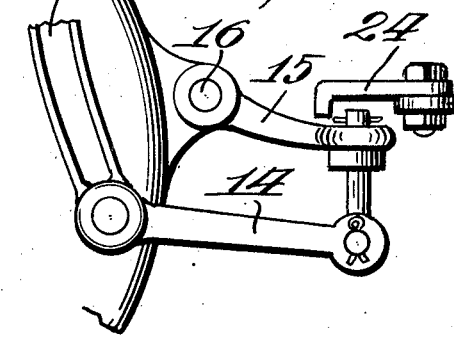
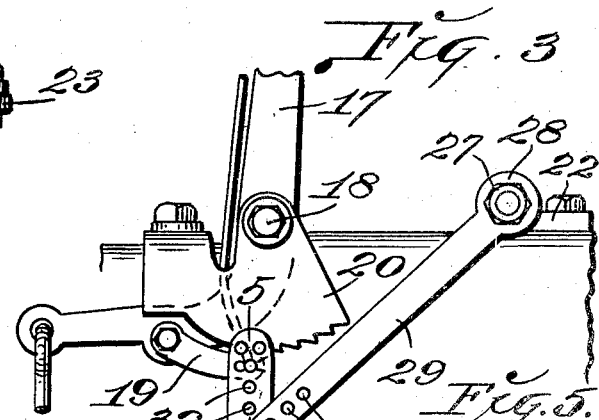
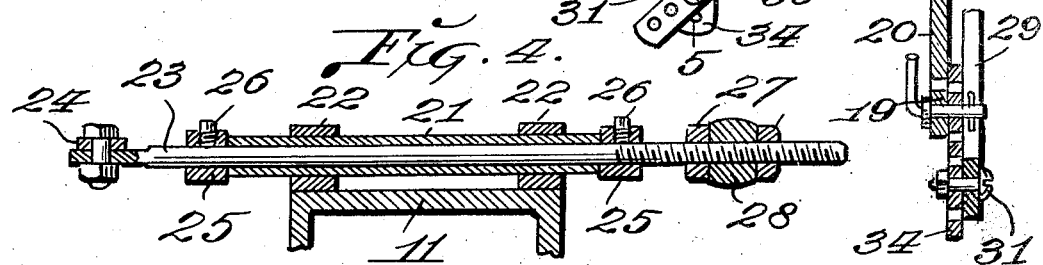
INVENTOR,
C. E. Ramey.
By Martin P. Smith Atty.

Patented Apr. 2, 1929.

1,707,415

UNITED STATES PATENT OFFICE.

CORNELIUS E. RAMEY, OF LOS ANGELES, CALIFORNIA.

AUTOMATIC EMERGENCY-BRAKE RELEASE.

Application filed May 11, 1927. Serial No. 190,561.

My invention relates to an automatic release for the emergency brakes of automobiles, the principal object of my invention being to provide a relatively simple, practical and inexpensive device that may be readily installed upon practically all makes of automobiles and which device will act automatically upon the operation of one of the control members of the automobile, preferably the clutch release pedal, to release the emergency brake.

It is the general practice of automobile drivers to set or apply the emergency brake when the vehicle is brought to a stop and it frequently happens that when the driver of the vehicle subsequently starts to drive the car, he forgets to release the emergency brake and thus the engine and driving mechanism are put under a considerable strain. It is the purpose of my invention to eliminate this possibility of driving the car with the emergency brake set and, as the clutch must be released in order to permit the gear shift lever to be actuated when the car is started, I propose to provide simple means between the gear shift lever or a part associated therewith and the latch or pawl that holds the emergency brake lever in set position and which means will be effective in disengaging the pawl and thereby release the emergency brake lever.

A further object of my invention is to provide a device of the character referred to that comprises relatively few operating parts and to construct the device so that it has a wide range of adjustability, thereby permitting the device to be adjusted from time to time to take up any wear or lost motion that may occur in the automobile parts with which it is associated.

With the foregoing and other objects in view, my invention consists in certain novel features of construction and arrangement of parts that will hereinafter be more fully described and claimed and illustrated in the accompanying drawing, in which—

Fig. 1 is a top plan view of the clutch and transmission housings of an automobile and showing my improved automobile emergency brake release applied thereto.

Fig. 2 is an enlarged elevational view looking in the direction indicated by the arrow 2 in Fig. 1.

Fig. 3 is an elevational view of the parts seen looking in the direction indicated by the arrow 3 in Fig. 1.

Fig. 4 is an enlarged cross section taken on the line 4—4 of Fig. 1.

Fig. 5 is an enlarged vertical section taken approximately on the line 5—5 of Fig. 3.

Referring by numerals to the accompanying drawings, which illustrate a practical embodiment of my invention, 10 designates the clutch housing of an automobile, 11 the housing or case for the transmission gear, 12 the gear shift lever, 13 the clutch actuating pedal, 14 an arm that is actuated by said pedal and which in turn is connected to and actuates a short crank arm 15 that is carried on the outer end of the clutch release shaft 16.

The lower portion of the usual emergency brake lever 17 is journaled on a horizontally disposed pin or bolt 18 at the side of the transmission housing 11 and said brake lever being provided with the usual pawl 19 that is adapted to engage the teeth of a fixed segment 20 that is secured in the usual manner to the transmission housing 11. All of the parts just described are of standard construction in a number of well known makes of automobiles.

My improved emergency brake release includes a tubular member 21 that is preferably arranged in transverse position on top of the transmission housing 11 in front of the emergency brake and gear shift lever, said tubular member being firmly held in position by suitable clamps 22 that are bolted to the transmission housing.

Extending through the tubular member 21 and arranged for rotation therein, is a rod 23, the left hand end of which projects a slight distance beyond the corresponding end of tube 21 and said left hand end being flattened and having secured thereto a forwardly projecting plate 24, the outer end of which overlies the end of the arm 15 that is connected to arm 14. It will be understood that when the clutch pedal is moved inward or downward to release the clutch, the outer end of arm 14 will be elevated and corresponding upward movement will be imparted to the outer end of arm 15.

Arranged on shaft 23 at the ends of the tubular member 21 are collars 25 that are locked to the shaft in any suitable manner, preferably by means of set screws 26 and when these collars are secured to the shaft, they hold the latter against lengthwise movement through the tube 21.

The right hand end of shaft 23 projects beyond the corresponding end of tube 21 and said projecting end is threaded to receive lock nuts 27 that are disposed on opposite sides of the head 28 of a downwardly and rearwardly projecting arm 29, said head 28 being perforated to receive the rod 23.

By proper manipulation of the nuts 27, the head 28 and arm 29 may be adjusted inwardly or outwardly upon the shaft 23. The lower portion of arm 29 is provided with a series of apertures 30 for the reception of a bolt or screw 31 and which latter may be seated in one of a series of apertures 32 that are formed in a short arm 34, the latter being pivotally connected to the pawl 19 that is carried by the emergency brake lever and which pawl engages the teeth of ratchet plate 20 to lock the brake lever when the latter is set.

When the emergency brake lever 17 is drawn rearwardly to set the emergency brake, the pawl 19 will move forwardly beneath the segment 20 and said pawl will engage in one of the teeth of said segment, thereby locking said brake lever in its set position. This setting of the emergency brake through arms 34 and 29 slightly rocks shaft 23 so that the free end of short arm 24 occupies a position directly above the outer end of arm 15. In the event that the driver of the vehicle starts the engine and fails to release the emergency brake, it will, of course, be necessary to release the clutch in order to shift the gears and start the car.

Upon depression of the clutch pedal 13, the outer ends of arms 14 and 15 will be elevated, thereby engaging the free end of arm 24 and moving the same upward a short distance, which movement rocks shaft 23 and swings arm 29 downward a short distance and through arm 34, pawl 19 will be disengaged and drawn away from the teeth of segment 20, thereby simultaneously releasing the emergency brake with the depression of the clutch pedal.

Thus it will be seen that the operation of my improved emergency brake release is entirely automatic and through the use of the automatic release, it will be impossible to start and drive the equipped automobile with its emergency brake set. By connecting the short arm 24 to the flat end of rod 23 with a bolt or screw, the angular position of said arm may be adjusted and the longitudinal position of the rod 23 in tube 21 may be adjusted by proper manipulation of the collars 25 and set screws 26.

Nuts 27 mounted on the threaded end of rod 23 provide means for adjusting the position of arm 29 on said rod and the two series of apertures 30 and 32 provide ample adjustment between the arm 29 and pawl 19. The adjustments just mentioned enable my improved emergency brake release to be readily applied to different makes and models of automobiles and they also enable the device to be adjusted to take up wear that may occur in the clutch, the brake linings, or the parts with which they are associated.

Thus it will be seen that I have provided an emergency brake release that is relatively simple in construction, inexpensive of manufacture and installation, entirely automatic in operation and very effective in performing the functions for which it is intended.

It will be understood that minor changes in the size, form and construction of the various parts of my improved emergency brake release may be made and substituted for those herein shown and described without departing from the spirit of my invention, the scope of which is set forth in the appended claims.

I claim as my invention:

1. The combination with an automobile emergency brake setting means, the transmission housing upon which said setting means is mounted and the automobile clutch releasing means, of a transversely disposed tubular bearing mounted on the transmission housing, a shaft mounted for longitudinal adjustment within said tubular housing, a member carried by one end of said shaft and adapted to be engaged by an operating part of the clutch releasing means and connections between said shaft and the latching means of the emergency brake lever.

2. The combination with an automobile emergency brake setting means, the transmission housing upon which said setting means is mounted and the automobile clutch releasing means, of a transversely arranged tubular bearing mounted in a bearing on the transmission housing, a shaft mounted for longitudinal adjustment within said tubular housing, a member adjustably carried by one end of said shaft and adapted to be engaged by an operating part of the clutch releasing means and means adjustably carried by the other end of said shaft and adjustably connected to the latching device of the emergency brake setting means.

3. The combination with an automobile emergency brake setting means, the transmission housing upon which said setting means is mounted and the automobile clutch releasing means, of a tubular member mounted on the transmission housing, a shaft journaled in said tubular member and longitudinally adjustable therein, a short arm carried by one end of said shaft and adapted to be engaged by a part of the clutch releasing means when the pedal of said clutch releasing means is depressed and means mounted on the other end of said shaft and connected to the latching means that is associated with the emergancy brake lever.

4. In a device of the class described, a rock shaft, a tubular bearing therefor, means carried by said shaft for retaining the same in differently adjusted positions within said tubular bearing, a short arm carried by one end of said rock shaft and adapted to be engaged by an operating part of the clutch releasing means of an automobile and means carried by the other end of said rock shaft and adapted to be connected to the latching means of the emergency brake lever of an automobile.

In testimony whereof I affix my signature.

CORNELIUS E. RAMEY.